(12) United States Patent
Yoon

(10) Patent No.: US 11,916,225 B2
(45) Date of Patent: Feb. 27, 2024

(54) LITHIUM SECONDARY BATTERY

(71) Applicant: SK INNOVATION CO., LTD., Seoul (KR)

(72) Inventor: Dock Young Yoon, Daejeon (KR)

(73) Assignee: SK ON CO., LTD., Seoul (KR)

(*) Notice: Subject to any disclaimer, the term of this patent is extended or adjusted under 35 U.S.C. 154(b) by 500 days.

(21) Appl. No.: 16/843,796

(22) Filed: Apr. 8, 2020

(65) Prior Publication Data

US 2020/0328410 A1    Oct. 15, 2020

(30) Foreign Application Priority Data

Apr. 9, 2019 (KR) .................. 10-2019-0041144
Mar. 31, 2020 (KR) .................. 10-2020-0039299

(51) Int. Cl.
| | |
|---|---|
| *H01M 4/36* | (2006.01) |
| *H01M 4/525* | (2010.01) |
| *H01M 4/58* | (2010.01) |
| *H01M 10/0525* | (2010.01) |
| *H01M 4/02* | (2006.01) |

(52) U.S. Cl.
CPC ........... *H01M 4/366* (2013.01); *H01M 4/525* (2013.01); *H01M 4/5825* (2013.01); *H01M 10/0525* (2013.01); *H01M 2004/021* (2013.01); *H01M 2004/028* (2013.01)

(58) Field of Classification Search
CPC ......... H01M 10/0525; H01M 10/0585; H01M 2004/021; H01M 2004/027; H01M 2004/028; H01M 4/131; H01M 4/133; H01M 4/136; H01M 4/366; H01M 4/525; H01M 4/5825; H01M 4/587; H01M 4/625
See application file for complete search history.

(56) References Cited

U.S. PATENT DOCUMENTS

| | | | | |
|---|---|---|---|---|
| 8,435,671 | B2 * | 5/2013 | Zaghib | H01M 4/366 |
| | | | | 429/208 |
| 2001/0004504 | A1 * | 6/2001 | Nakamizo | H01M 50/454 |
| | | | | 429/300 |
| 2006/0099495 | A1 * | 5/2006 | Suzuki | H01M 10/052 |
| | | | | 429/231.95 |

(Continued)

FOREIGN PATENT DOCUMENTS

| | | | |
|---|---|---|---|
| JP | 2013073924 A | * | 4/2013 |
| JP | 5213015 B2 | | 6/2013 |

(Continued)

OTHER PUBLICATIONS

L.-H. Hu, F.-Y. Wu, C.-T. Lin, A. N. Khlobystov, L.-J. Li. Graphene-modified LiFePO4 cathode for lithium ion battery beyond theoretical capacity, Nature Communications 4:1687, 2013.*

*Primary Examiner* — Carlos Barcena
(74) *Attorney, Agent, or Firm* — IP & T GROUP LLP

(57) ABSTRACT

A lithium secondary battery includes a cathode, an anode and a separation layer. The cathode includes a cathode current collector and a cathode active material base layer formed on the cathode current collector. The anode includes an anode current collector and an anode active material base layer formed on the anode current collector. The separation layer is interposed between the cathode and the anode. At least one of the cathode and the anode includes an active material coating layer having a thickness of 20 μm or less.

11 Claims, 3 Drawing Sheets

(56) References Cited

U.S. PATENT DOCUMENTS

| | | | |
|---|---|---|---|
| 2011/0123866 A1* | 5/2011 | Pan | H01M 4/583 |
| | | | 427/458 |
| 2016/0211554 A1* | 7/2016 | Umeyama | H01M 4/139 |
| 2018/0261827 A1* | 9/2018 | Yanagita | H01M 10/0563 |
| 2020/0075955 A1* | 3/2020 | Jeon | H01M 4/136 |

FOREIGN PATENT DOCUMENTS

| | | |
|---|---|---|
| KR | 10-2013-0001268 A | 1/2013 |
| KR | 10-1589993 B1 | 2/2016 |
| KR | 10-2017-0099748 A | 9/2017 |

\* cited by examiner

LITHIUM SECONDARY BATTERY

CROSS-REFERENCE TO RELATED APPLICATION AND CLAIM OF PRIORITY

This application claims priority to Korean Patent Applications No. 10-2019-0041144 filed on Apr. 9, 2019 and No. 10-2020-0039299 filed on Mar. 31, 2020 in the Korean Intellectual Property Office (KIPO), the entire disclosures of which are incorporated by reference herein.

BACKGROUND

1. Field

The present invention relates to a lithium secondary. More particularly, the present invention relates to a lithium secondary battery including an electrode assembly.

2. Description of the Related Art

A secondary battery which can be charged and discharged repeatedly has been widely employed as a power source of a mobile electronic device such as a camcorder, a mobile phone, a laptop computer, etc., according to developments of information and display technologies. The secondary battery includes, a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode, a separation layer (a separator), and an electrolyte immersing the electrode assembly. The lithium secondary battery may further include an outer case having, e.g., a pouch shape.

Recently, as an application of the lithium secondary battery has been expanded from a compact electronic device to a large-scaled device such as a hybrid vehicle which may not be provided with sufficient capacity and power output from the conventional lithium secondary battery.

For example, in the lithium secondary battery for an automobile, a plurality of electrode cells may be connected in series or in parallel to be fabricated as a module capable of providing enhanced power. In this case, as a dimension of the lithium secondary battery becomes greater, power-related properties may be drastically changed by failures of some of the electrode cells, and the lithium secondary battery may become vulnerable to an explosion due to a penetration of an external object.

Thus, developments of the lithium secondary battery providing enhanced power output and reliability in a limited space may be needed.

SUMMARY

According to an aspect of the present invention, there is provided a lithium secondary battery having improved power output and stability.

According to exemplary embodiments, a lithium secondary battery includes a cathode, an anode and a separation layer. The cathode includes a cathode current collector and a cathode active material base layer formed on the cathode current collector. The anode includes an anode current collector and an anode active material base layer formed on the anode current collector. The separation layer is interposed between the cathode and the anode. At least one of the cathode and the anode includes an active material coating layer having a thickness of 20 μm or less.

In some embodiments, the active material coating layer may include a different material from that of the cathode active material base layer or the anode active material base layer.

In some embodiments, the cathode may include a cathode active material coating layer having a thickness of 20 μm or less formed on a surface of the cathode active material base layer.

In some embodiments, the thickness of the cathode active material coating layer may be from 1 μm to 20 μm.

In some embodiments, the cathode active material base layer may include a lithium-nickel based oxide, and the cathode active material coating layer may include lithium iron phosphate (LFP).

In some embodiments, the lithium-nickel based oxide may include a compound represented by the following Chemical Formula 1:

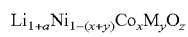  [Chemical Formula 1]

In the Chemical Formula 1 above, −0.05≤a≤0.15, 0.01≤x≤0.2, 0≤y≤0.2, 1.98≤z≤2.02, and M is at least one element selected from a group consisting of Mg, Sr, Ba, B, Al, Si, Mn, Ti, Zr and W.

In some embodiments, the cathode active material coating layer may further include graphene.

In some embodiments, the cathode active material coating layer may include a cathode coating particle, and the cathode active material base layer may include a cathode active material particle. A particle diameter of the cathode coating particle may be smaller than that of the cathode active material particle.

In some embodiments, the anode may include an anode active material coating layer having a thickness of 20 μm or less formed on a surface of the anode active material base layer.

In some embodiments, the anode active material base layer may include at least one of artificial graphite and natural graphite, and the anode active material coating layer may include lithium titanate (LTO).

In some embodiments, the anode active material base layer may include artificial graphite, and the anode active material coating layer may include natural graphite.

In some embodiments, the anode active material coating layer may further include hard carbon.

In some embodiments, the thickness of the anode active material coating layer may be from 1 μm to 20 μm.

In some embodiments, the anode active material coating layer may include an anode coating particle, and the anode active material base layer may include an anode active material particle. A particle diameter of the anode coating particle is smaller than that of the anode active material particle.

In some embodiments, the cathode may include a cathode active material coating layer formed on a surface of the cathode active material base layer, and the anode may include an anode active material coating layer formed on a surface of the anode active material base layer. A sum of thicknesses of the cathode active material coating layer and the anode active material coating layer may be 40 μm or less.

In some embodiments, the cathode active material coating layer may include carbon-free lithium iron phosphate (LFP), and the anode active material coating layer may include carbon-free lithium titanate (LTO).

According to exemplary embodiments of the present invention, a cathode or an anode included in the lithium secondary battery may include an active material base layer formed on a current collector and a coating layer formed on the active material base layer. In some embodiments, in a formation of the anode, an artificial graphite layer may be formed on an anode current collector, and then a coating layer including natural graphite, hard carbon or lithium titanate (LTO) may be formed on the artificial graphite layer. Accordingly, power output, capacity and life-span and stability may be improved in the anode.

In some embodiments, in a formation of the cathode, a lithium metal oxide layer may be formed on a cathode current collector, and then a coating layer containing lithium iron phosphate may be formed on the lithium metal oxide layer. Accordingly, explosion and ignition due to an external penetration may be effectively suppressed by the coating layer.

DETAILED DESCRIPTION OF THE EMBODIMENTS

In a lithium secondary battery including a cathode, an anode and a separation layer according to exemplary embodiments of the present inventive concepts, the cathode or the anode may include a current collector, an active material base layer formed on the current collector and a coating layer formed on the active material base layer to provide improved power output, life-span and operational stability.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
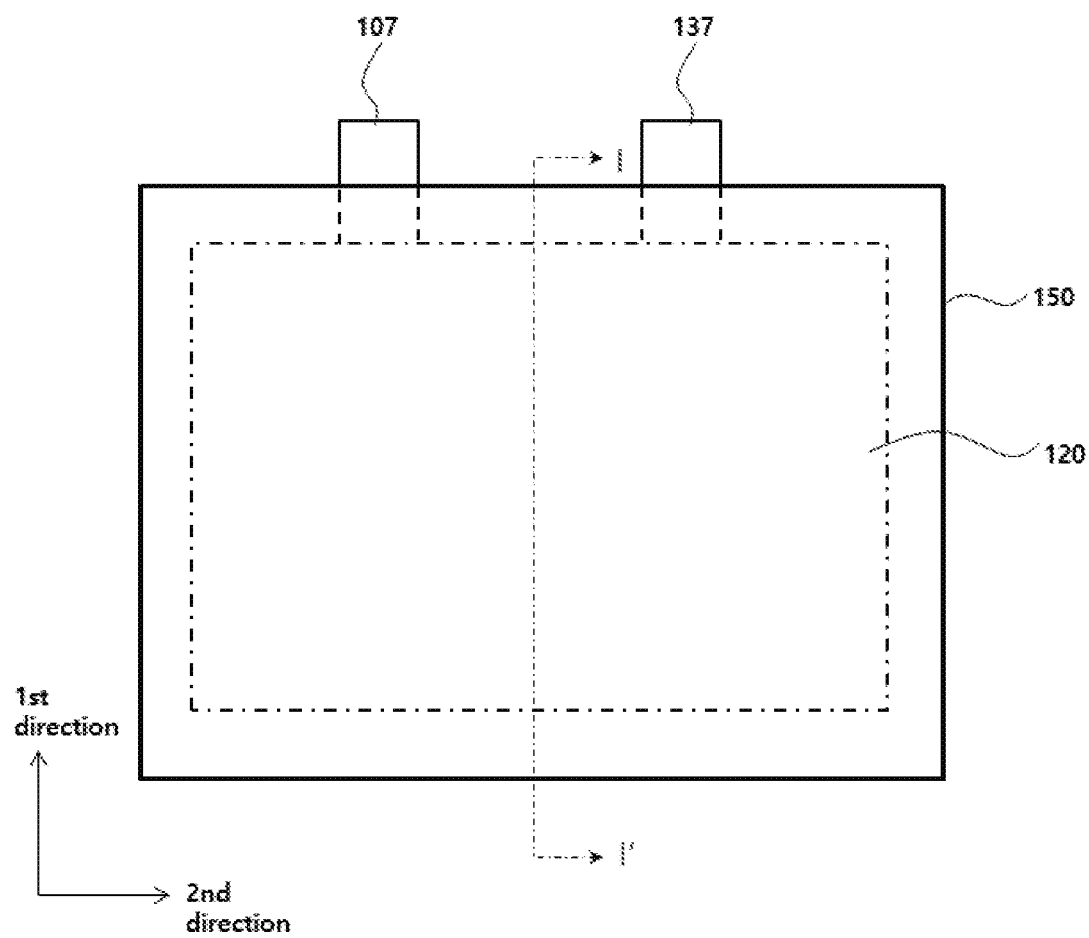
FIGS. 1 and 2 are a schematic top planar view and a schematic cross-sectional view, respectively, illustrating a lithium secondary battery in accordance with exemplary embodiments.
Figure 2:
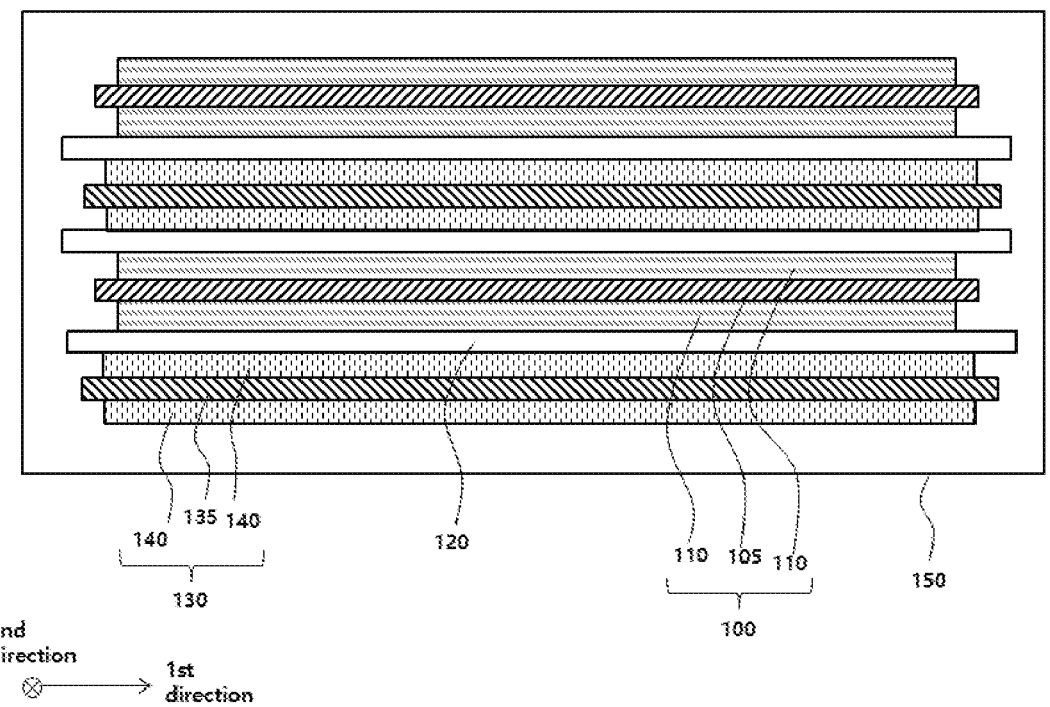

FIGS. 1 and 2 are a schematic top planar view and a schematic cross-sectional view, respectively, illustrating a lithium secondary battery in accordance with exemplary embodiments. For example, FIG. 2 is a cross-sectional view taken along a line I-I' of FIG. 1 in a thickness direction of the lithium secondary battery.

In FIGS. 1 and 2, two directions perpendicular to each other on a plane are defined as a first direction and a second direction. For example, the first direction may be a length direction of the lithium secondary battery, and the second direction may be a width direction of the lithium secondary battery.

For convenience of description, illustration of a cathode and an anode in FIG. 1 is omitted.

Referring to FIGS. 1 and 2, a lithium secondary battery may include an electrode assembly and a case accommodating the electrode assembly. The electrode assembly may include a cathode 100, and anode 130 and a separation layer 120.

The cathode 100 may include a cathode current collector 105 and a cathode active material layer 110 formed on at least one surface of the cathode current collector 105. In exemplary embodiments, the cathode active material layer 110 may be formed on both surfaces (e.g., an upper surface and a lower surface) of the cathode current collector 105.

The cathode current collector 105 may include stainless-steel, nickel, aluminum, titanium, copper or an alloy thereof. Preferably, aluminum or an alloy thereof may be used.

For example, a cathode active material may be mixed and stirred together with a binder, a conductive agent and/or a dispersive additive in a solvent to form a slurry. The slurry may be coated on the cathode current collector 105, and pressed and dried to form the cathode active material layer.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material may be relatively increased. Thus, capacity and power output of the lithium secondary battery may be improved.

The conductive agent may be added to facilitate electron mobility between the active material particles. For example, the conductive agent may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

In exemplary embodiments, the cathode active material layer 110 may have a multi-layered structure. In some embodiments, the cathode active material layer 110 may have a double-layered structure including a cathode active material base layer and a cathode active material coating layer.

Compositions and constructions of the cathode 100 and the cathode active material layer 110 will be described in more detail with reference to FIG. 3.

The anode 130 may include an anode current collector 135 and an anode active material layer 140 formed on at least one surface of the anode current collector 135. In exemplary embodiments, the anode active material layer 140 may be formed on both surfaces (e.g., an upper surface and a lower surface) of the anode current collector 135.

The anode current collector 135 may include gold, stainless-steel, nickel, aluminum, titanium, copper or an alloy thereof, preferably, may include copper or a copper alloy.

For example, an anode active material may be mixed and stirred together with a binder, a conductive agent and/or a dispersive additive in a solvent to form a slurry. The slurry may be coated on the anode current collector 135, and pressed and dried to form the anode active material layer 140.

The binder and the conductive agent substantially the same as or similar to those for the cathode 100 as mentioned above may be used. In some embodiments, the binder for the anode 130 may include an aqueous binder such as such as styrene-butadiene rubber (SBR) that may be used with a thickener such as carboxymethyl cellulose (CMC) so that compatibility with a carbon-based active material may be improved.

In some embodiments, an area and/or a volume of the anode 130 (e.g., a contact area with the separation layer 120) may be greater than that of the cathode 100. Thus, lithium ions generated from the cathode 100 may be easily transferred to the anode 130 without loss by, e.g., precipitation or sedimentation to further enhance power output and capacity.

In exemplary embodiments, the anode active material layer 140 may have a multi-layered structure. In some embodiments, the anode active material layer 140 may have a double-layered structure including an anode active material base layer and an anode active material coating layer.

Compositions and constructions of the cathode 130 and the cathode active material layer 140 will be described in more detail with reference to FIG. 4.

The separation layer 120 may be interposed between the cathode 100 and the anode 130. The separation layer 120 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 120 may be also formed from a non-woven fabric including a glass fiber with a high melting point, a polyethylene terephthalate fiber, or the like.

The separation layer 120 may extend between the cathode 100 and the anode 130 in the second direction, and may be folded and wound along a thickness direction of the lithium secondary battery. Accordingly, a plurality of the cathodes 100 and the anodes 130 may be stacked in the thickness direction via the separation layer 120.

For example, an electrode cell may be defined by the cathode 100 and the anode 130 facing each other with respect to an extending portion of the separation layer 120 in the second direction, and a plurality of the electrode cells may be stacked with respect to the separation layer 120 to form the electrode assembly. The electrode assembly may have e.g., a jelly roll shape.

The electrode assembly may be accommodated in the case 150 together with an electrolyte. The case 150 may include, e.g., a pouch, a can, etc.

In exemplary embodiments, the electrolyte may include non-aqueous electrolyte solution.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 1, a first electrode lead 107 and a second electrode lead 137 may protrude to an outside of the case 150.

In exemplary embodiments, cathode tabs from each cathode current collector 105 may be diverged and may extend in the first direction. The cathode tabs overlap each other in the thickness direction of the lithium secondary battery, and may be welded together with the case 150 at one end of the case 150. The welded cathode tabs may be substantially integrally merged and drawn out of the case 150 to form the first electrode lead 107.

Anode tabs from each anode current collector 135 may be diverged and may extend in the first direction. The anode tabs overlap each other in the thickness direction of the lithium secondary battery, and may be welded together with the case 150 at one end of the case 150. The welded anode tabs may be substantially integrally merged and drawn out of the case 150 to form the second electrode lead 137.

FIG. 1 illustrates that the first electrode lead 107 and the second electrode lead 137 are formed at the same side of the case 150 or the lithium secondary battery. However, the first electrode lead 107 and the second electrode lead 137 may be formed at opposite sides of the case 150 or the lithium secondary battery.

For example, the first electrode lead 107 may be formed at one end of the case 150, and the second electrode lead 137 may be formed at the other end of the case 150.

Figure 3:
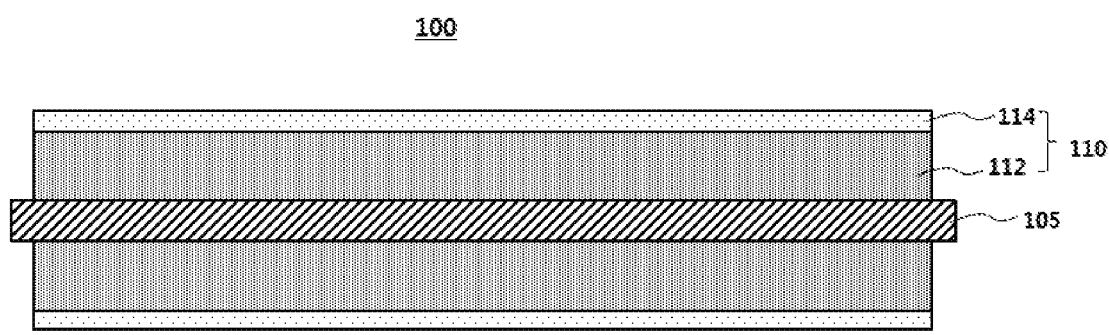
FIG. 3 is a schematic cross-sectional view illustrating a cathode of a lithium secondary battery in accordance with exemplary embodiments.

FIG. 3 is a schematic cross-sectional view illustrating a cathode of a lithium secondary battery in accordance with exemplary embodiments.

Referring to FIG. 3, the cathode 100 may include the cathode active material layer 110 formed on the cathode current collector 105, and the cathode active material layer 110 may be coated on each of upper and lower surfaces of the cathode current collector 105.

In exemplary embodiments, the cathode active material layer 110 may have a multi-layered structure, and may include a cathode active material base layer 112 and a cathode active material coating layer 114.

The cathode active material base layer 112 may directly contact the surface of the cathode current collector 105. The cathode active material coating layer 114 may be directly coated on the cathode active material base layer 112.

The cathode active material base layer 112 pray include cathode active material particles, and the cathode active material coating layer 114 may include cathode coating particles. The cathode active material particles and the cathode coating particles may be different materials. The cathode coating particles and the cathode active material particles different from each other may be used so that an amount of gas generated during charging/discharging may be reduced.

The cathode active material base layer 112 includes a lithium metal oxide as the cathode active material, and may include a lithium (Li)-nickel (Ni)-based oxide according to exemplary embodiments.

In some embodiments, the lithium metal oxide included in the cathode active material base layer 112 may be represented by Chemical Formula 1 below.

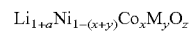  [Chemical Formula 1]

In the Chemical Formula 1, $-0.05 \leq a \leq 0.15$, $0.01 \leq x \leq 0.2$, $0 \leq y \leq 0.2$, $1.98 \leq z \leq 2.02$, and M may be at least one element selected from Mg, Sr, Ba, B, Al, Si, Mn, Ti, Zr or W. In an embodiment, $0.01 \leq x \leq 0.20$, $0.01 \leq y \leq 0.15$.

Preferably, in the Chemical Formula 1, M is manganese (Mn). In this case, a nickel-cobalt-manganese (NCM)-based lithium oxide may be used as the cathode active material.

For example, nickel (Ni) may serve as a metal related to a capacity of the lithium secondary battery. As an amount of nickel becomes higher, capacity and power output of the lithium secondary battery may be improved. However, an excessive amount of nickel may degrade of a life-span of the battery, and may be disadvantageous in an aspect of mechanical and electrical stability of the battery. For example, cobalt (Co) may serve as a metal related to a conductivity or a resistance of the lithium secondary battery. In an embodiment, M includes manganese (Mn), and Mn may serve as a metal related to the mechanical and electrical stability of the lithium secondary battery.

Capacity, power output, low resistance, and life-span stability from the cathode active material base layer 112 may be commonly improved through an interaction of the nickel, cobalt and manganese as described above.

In exemplary embodiments, the cathode active material coating layer 114 may include, e.g., lithium iron phosphate (e.g., $LiFePO_4$: LFP) as the cathode coating particles. For example, LFP may have an olivine structure, and may have a relatively high ignition and explosion stability compared to that of the NCM-based lithium oxide having a layered structure. The cathode active material coating layer 114 including LFP may be disposed at each of upper and lower faces of the cathode 100, so that risk of battery explosion and ignition due to penetration of an external object may be remarkably reduced.

LFP has high resistance and low conductivity compared to those of the NCM-based lithium oxide, and may be relatively disadvantageous for improving capacity and power output of the lithium secondary battery. However, according to exemplary embodiments, the cathode active material coating layer 114 including LFP may not be in a direct contact with the cathode current collector 105, but may be spaced apart from the cathode current collector 105 by the cathode active material base layer 112. Additionally, the cathode active material coating layer 114 may be formed as an individual layer from the cathode active material base layer 112, and thus LFP and the NCM-based lithium oxide may be separated from each other.

Thus, penetration stability may be effectively achieved without impairing high capacity, charge and discharge implementation with high power output, etc., by the cathode active material base layer 112.

In an embodiment, the cathode active material coating layer 114 may further include graphene together with LFP to further improve conductivity in the cathode active material coating layer 114.

A thickness of the cathode active material coating layer 114 may be smaller than a thickness of the cathode active material base layer 112. In exemplary embodiments, the thickness of the cathode active material coating layer 114 may be 20 μm or less. For example, the thickness of the cathode active material coating layer 114 may be from about 0.1 μm to about 20 μm, and the thickness of the cathode active material base layer 112 may be from about 20 μm to about 200 μm.

For example, within the range of the thickness of the cathode active material coating layer 114, electrolyte impregnation properties may be improved while achieving penetration/ignition stability, thereby to increase life-span of the secondary battery and also enhance life-span uniformity.

For example, if the thickness of the cathode active material coating layer 114 is excessively increased, a length of a lithium ion path may be increased to degrade the power output/capacity from the cathode active material base layer 112. Further, the electrolyte impregnation properties may be also deteriorated to reduce electrical uniformity.

In a preferable embodiment, the thickness of the cathode active material coating layer 114 may be from about 1 μm to about 20 μm, preferably from about 1 μm to about 10 μm.

In a preferable embodiment, the thickness of the cathode active material base layer 112 may be from about 50 μm to about 200 μm, or from about 100 μm to about 200 μm.

In some embodiments, the cathode coating particle (e.g., an LFP particle) may have a smaller particle diameter than that of the cathode active material particle (e.g., the NCM-based lithium oxide particle). Accordingly, surface planarity of the cathode may be improved by the cathode active material coating layer 114, and an adhesion to the separation layer 120 may be also enhanced. Therefore, charging/discharging efficiency of the lithium secondary battery may be also improved.

For example, the particle diameter of the cathode coating particle may be adjusted from about 0.1 μm to about 10 μm to be smaller than the particle diameter of the cathode active material particle.

In some embodiments, the LFP particles used as the cathode coating particle may be substantially carbon-free particles. For example, the LFP particles may not include a carbon coating or a carbon doping. Therefore, the cathode active material coating layer 114 may be prevented from being deformed or peeled due to an inherent electrical conductivity of a carbon-based material or an expansion/contraction by a self-charging/discharging of the carbon-based material.

Figure 4:
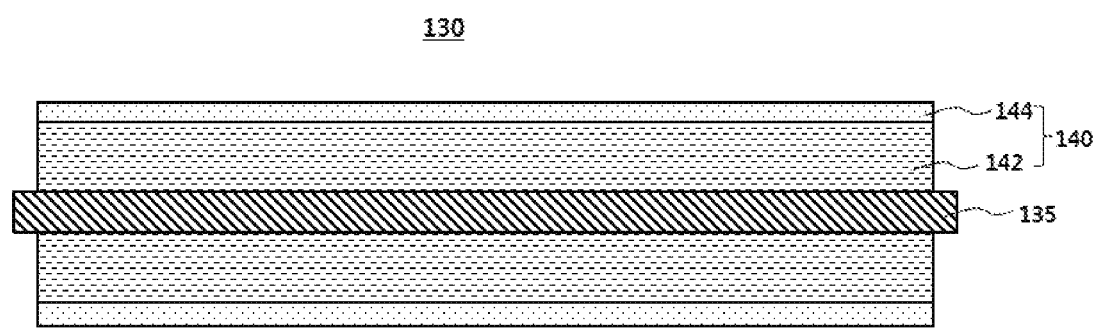
FIG. 4 is a schematic cross-sectional view illustrating an anode of a lithium secondary battery in accordance with exemplary embodiments.

FIG. 4 is a schematic cross-sectional view illustrating an anode of a lithium secondary battery in accordance with exemplary embodiments.

Referring to FIG. 4, the anode 130 may include the anode active material layer 140 formed on the anode current collector 135, and the anode active material layer 140 may be coated on each of upper and lower surfaces of the anode current collector 135.

In exemplary embodiments, the anode active material layer 140 may have a multi-layered structure, and may include an anode active material base layer 142 and an anode active material coating layer 144.

The anode active material base layer 142 may directly contact the surface of the anode current collector 135. The anode active material coating layer 144 may be directly coated on the anode active material base layer 142.

The anode material base layer 142 may include anode active material particles, and the anode material coating layer 144 may include anode coating particles. The anode active material particles and the anode coating particles may be different materials. The anode coating particles and the anode active material particles different from each other may be used so that an amount of gas generated during charging/discharging may be reduced.

In exemplary embodiments, the anode active material base layer 142 may include a carbon-based active material. For example, the anode active material base layer 142 may include artificial graphite and/or natural graphite having a primary particle structure and/or a secondary particle structure. In exemplary embodiments, the anode active material coating layer 144 may include natural graphite, hard carbon, and/or lithium titanate (LTO).

Artificial graphite has relatively greater life-span properties than those of natural graphite. Natural graphite has a relatively large specific surface area compared to that of artificial graphite, and thus may have a relatively low resistance and may be advantageous from an aspect of improving power output.

In an embodiment, the anode active material base layer 142 may include artificial graphite, and the anode active material coating layer 144 may include natural graphite. In this case, the life-span properties of the lithium secondary battery may be improved through artificial graphite to obtain enhanced cycle reproducibility even during repeated charging/discharging cycles. Further, the anode active material coating layer 144 may include natural graphite so that power output properties at a low temperature may be improved while also enhancing a battery capacity.

In an embodiment, the anode active material coating layer 144 may include hard carbon together with natural graphite. For example, natural graphite and hard carbon may be mixed together and included using a binder such as PVDF.

In an embodiment, the anode active material base layer 142 may include natural graphite, and the anode active material coating layer 144 may include LTO.

LTO may have, e.g., a spinel crystal structure in which insertion and desorption of lithium ions may be allowed while stably maintaining the crystal structure. Thus, LTO may provide improved life-span properties, high voltage and high temperature stability compared to those from graphite-based materials.

Thus, when natural graphite may be applied to the anode active material base layer 142 to improve low temperature output and charge/discharge properties, the anode material base layer 142 may be covered with the anode material coating layer 144 including LTO so that the life-span properties may be effectively improved or supplemented.

As described above, the anode active material base layer 142 and the anode active material coating layer 144 may include different materials and may be formed as separate layers so that the power output or life-span improvements from each layer may be implemented independently. Thus, synergetic effects from the anode active material coating layer 144 may be effectively achieved without inhibiting inherent effects from the anode active material included in the anode active material base layer 142.

In some embodiments, a thickness of the anode active material coating layer 144 may be smaller than a thickness of the anode active material base layer 142. In exemplary embodiments, the thickness of the anode active material coating layer 144 may be 20 μm or less. For example, the thickness of the anode active material coating layer 144 may be from about 0.1 μm to about 20 μm, and the thickness of the anode active material base layer 142 may be from about 20 μm to about 200 μm.

For example, within the thickness range of the anode active material coating layer 144, electrolyte impregnation properties of the anode may be improved while achieving penetration/ignition stability, thereby to increase life-span of the secondary battery and also enhance life-span uniformity.

For example, if the thickness of the anode active material coating layer 144 is excessively increased, a length of a lithium ion path may be increased to degrade the power output/capacity from the anode active material base layer 142. Further, the electrolyte impregnation properties may be also deteriorated to reduce electrical uniformity.

In a preferable embodiment, the thickness of the anode active material coating layer 144 may be from about 1 μm to about 20 μm, preferably from about 1 μm to about 10 μm.

In a preferable embodiment, the thickness of the anode active material base layer 142 may be from about 50 μm to about 200 μm, or from about 100 μm to about 200 μm.

In some embodiments, the anode coating particle (e.g., an LTO particle) may have a smaller particle diameter than that of the anode active material particle (e.g., the graphite-based particle). Accordingly, surface planarity of the anode may be improved by the anode active material coating layer 144, and an adhesion to the separation layer 120 may be also enhanced. Therefore, charging/discharging efficiency of the lithium secondary battery may be also improved.

For example, the particle diameter of the anode coating particle may be adjusted from about 0.01 μm to about 5 μm to be smaller than the particle diameter of the anode active material particle.

In some embodiments, the LTO particles used as the anode coating particles may be substantially carbon-free particles. For example, the LTO particles may not include a carbon coating or a carbon doping. Therefore, the anode active material coating layer 144 may be prevented from being deformed or peeled due to an inherent electrical conductivity of a carbon-based material or an expansion/contraction by a self-charging/discharging of the carbon-based material.

In exemplary embodiments, the lithium secondary battery may include a coating layer having a thickness of 20 μm or less in at least one of the cathode 100 and the anode 130. Accordingly, a lithium secondary battery having improved power output, capacity, life-span and penetration stability at each electrode may be provided.

In some embodiments, the lithium secondary battery may include a coating layer in both the cathode 100 and the anode 130. In this case, a sum of the thicknesses of the cathode active material coating layer 114 and the anode active material coating layer 144 may be adjusted to about 40 μm or less.

Hereinafter, preferred embodiments are proposed to more concretely describe the present invention. However, the following examples are only given fir illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

Example 1

(1) Preparation of Cathode

A cathode slurry was prepared by mixing $LiNi_{0.8}Co_{0.1}Mn_{0.1}O_2$ as a cathode active material, carbon black as a conductive agent and PVDF as a binder by a weight ratio of 92:5:3. The cathode slurry was coated, dried, and pressed on an aluminum substrate to form a cathode active material base layer (130 μm).

A slurry including lithium iron phosphate (LFP), carbon black and PVDF by a weight ratio of 92:5:3 was prepared, and then coated and dried on the cathode active material base layer to from a cathode active material coating layer (10 μm).

(2) Preparation of Cathode

An anode slurry was prepared by mixing 92 wt % of artificial graphite as an anode active material, 2 wt % of SBR-based binder, 1 wt % of CMC as a thickener and 5 wt % of a flake type amorphous graphite. The anode slurry was coated, dried, and pressed on a copper substrate to form an anode active material layer (140 μm).

(3) Fabrication of Secondary Battery

The cathode and the anode obtained as described above were disposed with a polyethylene separator (25 μm) interposed therebetween to form an electrode cell, and the electrode cells were stacked to form an electrode assembly. The electrode assembly was inserted in a pouch and electrode tab portions were welded. An electrolyte was injected to form a secondary battery.

The electrolyte was prepared by dissolving 1 M $LiPF_6$ in a mixed solvent of ethylene carbonate/ethyl methyl carbonate/diethyl carbonate (EC/EMC/DEC) (25/45/30; volume ratio), and then 1 wt % of vinylene carbonate, 0.5 wt % of 1,3-propensultone (PRS) and 0.5 wt % of lithium bis(oxalato) borate (LiBOB) were added.

Example 2

A secondary battery was fabricated by the same method as that in Example 1 except that a thickness of the LFP-containing cathode active material coating layer was changed to 20 μm.

Example 3

A secondary battery was fabricated by the same method as that in Example 1 except that a mixture of LFP and graphene (weight ratio 9:1) was used instead of LFP as the slurry for the cathode active material coating layer.

Example 4

A secondary battery was fabricated by the same method as that in Example 1 except that the cathode active material coating layer was omitted and an anode active material coating layer containing lithium titanate (LTO) having a thickness of 10 μm was formed.

Specifically, a slurry for the anode active material coating layer was prepared by mixing 92 wt % of lithium titanate (LTO), 2 wt % of SBR-based binder, 1 wt % of CMC as a thickener and 5 wt % of a flake type amorphous graphite. The slurry was coated and dried on the anode active material layer to form the anode active material coating layer.

Example 5

A secondary battery was fabricated by the same method as that in Example 1 (including the cathode active material coating layer of 10 μm) except that the anode active material coating layer having a thickness of 10 μm was formed (see Example 4).

Example 6

A secondary battery was fabricated by the same method as that in Example 5 except that a thickness of the cathode active material coating layer was 20 μm and a thickness of the anode active material coating layer was 20 μm.

Example 7

A secondary battery was fabricated by the same method as that in Example 5 except that a thickness of the cathode active material coating ayer was 10 μm and a thickness of the anode active material coating layer was 30 μm.

Comparative Example 1

A secondary battery was fabricated by the same method as that in Example 1 except that the cathode active material coating layer was omitted and the cathode active material base layer was formed with a thickness of 140 μm.

Comparative Example 2

A secondary battery was fabricated by the same method as that in Example 1 except that a thickness of the LFP-containing cathode active material coating layer was changed to 25 μm.

Comparative Example 3

A secondary battery was fabricated by the same method as that in Example 1 except that a thickness of the LFP-containing cathode active material coating layer was changed to 30 μm.

Comparative Example 4

A secondary battery was fabricated by the same method as that in Example 1 except that the cathode active material coating layer was omitted and an anode active material coating layer containing lithium titanate (LTO) having a thickness of 30 μm was formed.

Comparative Example 5

A secondary battery was fabricated by the same method as that in Example 1 except that the cathode active material coating layer was omitted and an anode active material coating layer containing lithium titanate (LTO) having a thickness of 40 μm was formed.

Comparative Example 6

A secondary battery was fabricated by the same method as that in Example 1 except that a thickness of the LTO-containing anode active material coating layer having a thickness of 40 μm was added.

Experimental Example (1) Measuring 0.1 C Discharging Capacity

One cycle of a charging (CC/CV 0.1 C 4.3V 0.05 CA CUT-OFF) and a discharging (CC 0.1 C 3.0V CUT-OFF) was performed using the secondary batteries of Examples and Comparative Examples, and an initial discharging capacity was measured (CC: constant current, CV: Constant voltage).

(2) Measuring 0.1 C Discharging Capacity

A charging (CC/CV 0.5 C 4.3V 0.05 CA CUT-OFF) and a discharging (CC 1.0 C 3.0V CUT-OFF) were performed using the secondary batteries of Examples and Comparative Examples, and a discharging capacity was measured.

(3) Evaluation of Penetration Stability

The secondary batteries of Examples and Comparative Examples were penetrated using a nail having a diameter of 3 mm with a rate of 80 mm/sec. Stability of the secondary batteries after the penetration was evaluated based on a standard below.

Penetration Stability, EUCAR Hazard Level

L1: No malfunction occurs from the battery
L2: Irreversible damages of the battery occur L3: A weight of an electrolyte in the battery was decreased by a ratio less than 50%
L4: A weight of an electrolyte in the battery was decreased by a ratio of 50% or more
L5: Ignition or explosion occurs
The results are shown in Table 1 below.

TABLE 1

| | 0.1 C discharging capacity (mAh) | 1 C discharging capacity (mAh) | Penetration Stability |
|---|---|---|---|
| Example 1 | 1858 | 1840 | L3 |
| Example 2 | 1854 | 1790 | L3 |
| Example 3 | 1855 | 1845 | L3 |
| Example 4 | 1856 | 1837 | L3 |
| Example 5 | 1853 | 1807 | L3 |
| Example 6 | 1854 | 1750 | L2 |
| Example 7 | 1854 | 1670 | L2 |
| Comparative Example 1 | 1881 | 1880 | L5 |
| Comparative Example 2 | 1856 | 1778 | L3 |
| Comparative Example 3 | 1835 | 1724 | L3 |
| Comparative Example 4 | 1845 | 1722 | L3 |
| Comparative Example 5 | 1843 | 1678 | L3 |
| Comparative Example 6 | 1856 | 1650 | L3 |

Referring to Table 1 above, the batteries of Examples including a coating layer having a thickness of 20 µm or less in the cathode or the anode provided generally improved penetration stability from an electrode passivation.

In Comparative Examples 2 to 6, the thickness of the coating layer exceeded a desired range. Accordingly, a length of a lithium ion transfer path was increased to excessively degrade the 1 C discharging capacity relative to the 0.1 C discharging capacity.

The batteries of Examples 6 and 7 including coating layers both in the cathode and the anode provided more improved penetration stability.

What is claimed is:

1. A lithium secondary battery, comprising:
   a cathode including a cathode current collector, a cathode active material base layer formed on the cathode current collector and a cathode active material coating layer formed on a surface of the cathode active material base layer;
   an anode including an anode current collector, an anode active material base layer formed on the anode current collector and an anode active material coating layer formed on a surface of the anode active material base layer; and
   a separation layer interposed between the cathode and the anode,
   wherein the cathode active material coating layer has a thickness of 20 µm or less,
   wherein the anode material coating layer has a thickness of 20 µm or more and 30 µm or less,
   wherein a sum of thicknesses of the cathode active material coating layer and the anode active material coating layer is 40 µm or less,
   each thickness of the cathode active material base layer and the anode active material base layer is in a range from 100 µm to 200 µm, and
   wherein the cathode active material base layer includes a lithium-nickel based oxide, and the cathode active material coating layer includes lithium iron phosphate (LFP), and
   wherein the lithium-nickel based oxide includes a compound represented by the following Chemical Formula 1:

$$Li_{1+a}Ni_{1-(x+y)}Co_xM_yO_z \qquad \text{[Chemical Formula 1]}$$

wherein, in the Chemical Formula 1 above, $-0.05 \leq a \leq 0.15$, $0.01 \leq x \leq 0.2$, $0 \leq y \leq 0.2$, $1.98 \leq z \leq 2.02$, and M is at least one element selected from a group consisting of Mg, Sr, Ba, B, Al, Si, Mn, Ti, Zr and W.

2. The lithium secondary battery according to claim 1, wherein the anode active material coating layer includes a different material from that of the anode active material base layer.

3. The lithium secondary battery according to claim 1, wherein the thickness of the cathode active material coating layer is from 1 µm to 20 µm.

4. The lithium secondary battery according to claim 1, wherein the cathode active material coating layer further includes graphene.

5. The lithium secondary battery according to claim 1, wherein the cathode active material coating layer includes a cathode coating particle, and the cathode active material base layer includes a cathode active material particle,
   wherein a particle diameter of the cathode coating particle is smaller than that of the cathode active material particle.

6. The lithium secondary battery according to claim 1, wherein the anode active material base layer includes at least one of artificial graphite and natural graphite, and the anode active material coating layer includes lithium titanate (LTO).

7. The lithium secondary battery according to claim 1, wherein the anode active material base layer includes artificial graphite, and the anode active material coating layer includes natural graphite.

8. The lithium secondary battery according to claim 7, wherein the anode active material coating layer further includes hard carbon.

9. The lithium secondary battery according to claim 1, wherein the anode active material coating layer includes an anode coating particle, and the anode active material base layer includes an anode active material particle,
   wherein a particle diameter of the anode coating particle is smaller than that of the anode active material particle.

10. The lithium secondary battery according to claim 1, wherein the cathode active material coating layer includes carbon-free lithium iron phosphate (LFP), and the anode active material coating layer includes carbon-free lithium titanate (LTO).

11. A lithium secondary battery, comprising:
    a cathode including a cathode current collector, a cathode active material base layer formed on the cathode current collector and a cathode active material coating layer formed on a surface of the cathode active material base layer;
    an anode including an anode current collector, an anode active material base layer formed on the anode current collector and an anode active material coating layer formed on a surface of the anode active material base layer; and
    a separation layer interposed between the cathode and the anode, wherein at least one of the cathode active material coating layer and the anode active material coating layer has a thickness of 20 μm or less,
each thickness of the cathode active material base layer and the anode active material base layer is in a range from 100 μm to 200 μm,
wherein the anode active material base layer includes artificial graphite, and the anode active material coating layer includes natural graphite, and
wherein the anode active material coating layer further includes hard carbon.

* * * * *